March 19, 1963  K. BEYER-OLSEN ETAL  3,081,493
METHOD FOR MAKING BY ROTARY CASTING A BUOYANT BODY OF
PLASTIC FURNISHED WITH A PASSAGE THERETHROUGH
Filed May 27, 1960
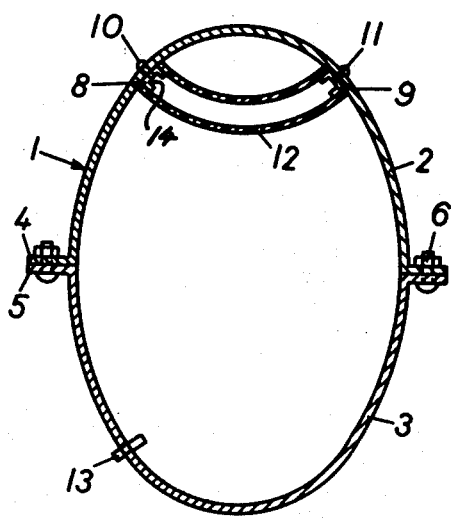
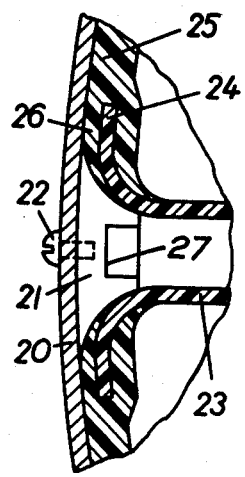
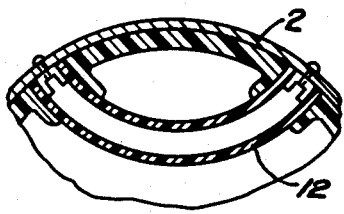
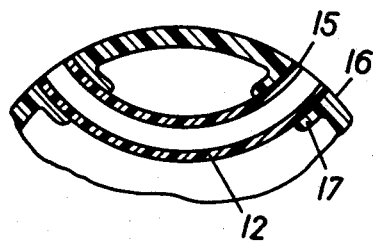
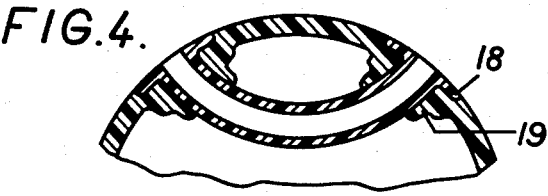
Inventors
KNUT BEYER-OLSEN
AND OTTO STEFFENSEN
By Wenderoth, Lind & Ponack
Attorneys United States Patent Office  3,081,493
Patented Mar. 19, 1963

3,081,493
METHOD FOR MAKING BY ROTARY CASTING A BUOYANT BODY OF PLASTIC FURNISHED WITH A PASSAGE THERETHROUGH
Knut Beyer-Olsen and Otto Steffenssen, both of Kirkegaten 10, Alesund, Norway
Filed May 27, 1960, Ser. No. 32,253
Claims priority, application Norway May 28, 1959
9 Claims. (Cl. 18—36)

The present invention relates to buoyant bodies, for instance floats for fishing nets and lines, and more particularly the invention relates to a method for making hollow, seamless buoyant bodies furnished with one or more passages therethrough which are situated inside the outer boundary of the buoyant body.

It is prior known to provide passages in hollow plastic bodies by locating in the mould a suitable metal core, which during the moulding of the hollow body proper is being coated with plastic, thereby providing the desired passage for a rope or the like.

An inherent drawback with the above mentioned method is that even when employing a small core it is often difficult to provide an adequate thickness of the coating on the core, i.e. an adequate wall thickness in the passage. And further, when it is desired to make a soft hollow plastic body, such soft plastic frequently will prove too weak to render the passage sufficient strength.

These and other drawbacks may partly be avoided by applying to the core, before it is placed in the mould, a coating of plastic. In so doing it is possible to obtain a coating on the core having suitable thickness, and further, by using a stronger plastic for the coating than for the rest of the hollow body it is possible to render the passage sufficient strength for many purposes. This latter method is described in applicants' copending patent application No. 778,980, filed December 8, 1958, now U.S. Patent No. 3,020,669.

Experience has shown, however, that the method of pre-coating the core and placing same in the mould prior to the moulding of the hollow body is encumbered by many difficulties. One shall mention that air is often being trapped between the core and its coating. This air will expand during the moulding of the hollow body owing to the elevated temperature, and frequently result in deformation and cavitation in the passage wall.

Another problem is that the heat conductive metal core assumes quite high temperatures owing to heat conduction from the mould, having to effect that the already cured core may be subjected to an undesirable heating and over-curing the moulding of the hollow body.

A further problem is that it frequently proves difficult to remove the core from the passage when the casting of the hollow body is completed.

A principal object of the present invention is to provide a new and improved method of producing hollow plastic bodies furnished with a passage for a rope or the like.

The method according to the invention comprises making in a first operation a tube-shaped plastic element, attaching to the inside face of one part of a hollow two-part mould two spaced-apart knobs and locating on said knobs said tube-shaped element by threading the openings of the element on the knobs, the openings of said tube-shaped element when positioned in the mould being in close proximity of the inside surface of the mould, placing thermoplastic material in said mould and removeably attaching the mould parts together, heating and rotating said closed mould causing said thermoplastic material to cling to the interior surface to the mould and to the external surfaces of the opening portions of the tube-shaped element, thereby causing said opening portions of the element to be imbedded in said thermoplastic material but leaving the openings free and thereafter separating the mould parts and removing the buoyant body from the mould and from said knobs.

By employing the method according to the invention the chief drawbacks pertaining to earlier methods are avoided. Simultaneously the casting operation of such hollow bodies is greatly simplified, for one thing by the fact that the core is no longer needed. The finished hollow body may be removed from the mould ready for use, its fabrication involving a minimum of required working operations.

In order to illustrate the method according to the invention, the attached drawings illustrate the manufacture of some preferred embodiments of the invention, but it will be understood that the method may be employed in the manufacture of other embodiments of the invention by suitable adaptation of the basic principles of the method.

In the drawing:
FIG. 1 is an axial sectional view of a shell-shaped mould provided with inside knobs, whereon is installed a tube-shaped element.
FIG. 2 shows on a larger scale a fragmentary similar view of the same mould and a body cast in the mould.
FIG. 3 is a view similar to FIG. 2 of the buoyant body, this being removed from the mould.
FIG. 4 is a similar view of a portion of a buoyant body provided with a passage according to a somewhat different embodiment of the invention.
FIG. 5 is a fragmentary section illustrating a further realization of the method according to the invention.

In FIG. 1, 1 denotes generally a shell-shaped mould consisting of the two halves 2 and 3, which can be joined by means of flanges 4 and 5, and for instance suitable bolts 6. On the inside surface of one of the mould halves are attached two knobs 8 and 9, said knobs being either permanently fixed to the wall surface or being detachably secured by means of fastening screws 10 and 11 extending from the outside face of the mould into threaded bores in the knobs. The knobs are preferably provided with recesses 14. The knobs can further be given a conical shape or the like, as will best be seen in FIG. 5. (Reference number 21.) In FIG. 1 is shown an arched tube 12, said tube 12 being secured on the knobs 8 and 9. The tube openings have, as will be understood, inside diameters substantially equal to that of the knobs, and the tube is otherwise of a suitable length such that each of its openings rest against the inside surface of the mould, or against those portions of the knobs being in close proximity to the mould surface.

Attached in the mould wall there is further a device 13, preferably made in plastic, and being provided with a longitudinal bore and if desired a suitable valve device. The device 13 is moulded into the wall of the buoyant body during the casting of same and serves as the air valve housing in the finished inflatable buoyant body, but constitutes no part of the present invention.

The basic principles of the method according to the invention can be divided into the following steps of operation:

(I) While the two-part mould is taken apart, the tube element is secured on the knobs. This operation may be carried out in several ways depending on the shape of the tube, the shape of the knobs and also on the characteristics of the material in the tube element.

If the tube element is made of a fairly soft plastic it can be threaded on to the knobs and thereby be secured firmly thereon. The knobs are in such case preferably given a suitable conical shape, which shape facilitates the threading-on of the tube opening and also aid in the support of the tube element. If, however, the plastic tube is made of a rigid plastic material, one or both knobs must be detachably fixed to the mould surface for instance by means of fastening screws 10 and 11.

In such case the positioning of the tube element in the mould is initiated by locating the detached knob or knobs in the tube opening, whereafter the tube element is located in the mould such that the knobs and thus the tube element can be fastened to the mould surface by means of the screws 10 and 11.

It is, however, a preferred realization of the method according to the invention that the plastic tube is made of fairly hard, but flexible material such that the tube can be bent manually whereafter each tube opening is supported on its respective end. The tube shaft shall then, when it is left at its own, tend to straighten and thus be pressed firmly on to the knobs, subjecting the tube shaft to a certain stress.

It will be understood that a combination of the above described cases frequently will take place.

(II) When the plastic tube has been fitted in the mould, the mould is supplied with a measured quantity of, for example polyvinyl chloride paste, and is closed. The rotatory casting may then take place for instance in an apparatus pursuant to applicants' copending patent application No. 799,563, now abandoned.

(III) When the casting operation is completed the mould is opened, whereafter the finished hollow body furnished with a passage can be taken out. If the tube is made of a fairly soft plastic, the entire hollow body can be pulled directly from the mould, the openings of the tube, now the passage, being drawn off the knobs which thus remain on the mould surface. If, on the other side, the tube is stiff, at least one of the knobs as a rule first must be released from the mould surface by unscrewing one of the screws 10 or 11, whereafter the hollow body is removed from the mould, the released knob or knobs still being situated in the tube (passage) opening. The knob or knobs are thereafter pulled out of the passage and are reinstalled in the mould together with a tube-element such that the mould is ready for reuse.

In FIG. 3 is shown a section of a portion of a hollow body according to the invention. As it appears the opening edges of the tube 15 are in alignment with the adjacent external surface 16 of the hollow body, and on the internal side a fraction of the casting material for the hollow body itself has in course of the casting spread inwardly along the tube 12 providing a reinforcing tube-shaped extension 17. The tube is thus being integrally joined with the wall of the buoyant body.

FIG. 4 shows a section through a somewhat altered embodiment of the invention. In certain cases it may be desirable for the sake of strength to obtain an additional strengthening in the connection between the wall of the float and the tube, and this can be attained by furnishing the tube openings with flanges which are made to rest against the mould wall when the tube is placed in position in the mould. The material to the hollow body itself will then during the casting of same spread over the flange and embed same, as indicated at 19, having the result that the joining connection between the tube and the hollow body is being effected over a large surface.

FIG. 5 illustrates a further embodiment of the invention; two identical knobs, only one 21 of which is shown, and which can be fastened to the mould 20 by a screw 22, is made partly hollow 27 and given a conical or other suitable shape such that flanges 24 at the tube openings are being located at a certain distance from the inner surface of the mould, having to effect that the casting material 25 for the hollow body during the casting of same flows in to the knob along the outside as well as along the inside of the flange 24. By this arrangement the flanges on the tube will be completely embedded into the wall of the hollow body proper, whereby the joining contact between the tube and the hollow body takes place over a large surface rendering a uniform distribution of stresses and forces arising in the passage when the finished float is used let's say on a fishing gear.

As will be understood the method according to the invention may be employed to provide various types of passages, and the method can be modified to suit plastic material of different properties, i.e., whether soft or hard. A requirement is that the plastic is mouldable in some way or other, and that it is capable of being moulded or joined firmly to the plastic material which is being used for casting the hollow body itself.

In the above description mention has only been made of arched passages, since such are found most suitable for hollow bodies having curved surfaces; it shall be understood, however, that the method according to the invention can also be used for making straight passages.

We claim:

1. A method of making a buoyant body of plastic and having a passage therethrough for a rope or the like, which comprises making in a first operation a tube-shaped plastic element, providing a shell-shaped two part mold having means for attaching to the inside surface of one of the parts thereof two knobs at points spaced from each other, attaching two knobs and the tube-shaped plastic element extending between them to said one part of the shell-shaped mold with the openings in the ends of said tube-shaped element in close proximity to the inside surface of the mold, placing thermoplastic material in one of said mold parts and removably attaching the mold parts together, heating and rotating the closed mold causing the thermoplastic material to cling to the interior surface of the mold and to the external surfaces of the ends of the tube-shaped element, thereby causing the ends of the element to be embedded in said thermoplastic material but leaving the openings free, and thereafter separating the mold parts and removing the buoyant body from the mold and from said knobs.

2. A method as claimed in claim 1 in which said knobs are first attached to the said part of said mold, and said tube-shaped element is then mounted on said knobs.

3. A method as claimed in claim 1 in which said knobs are first inserted into the ends of said tube-shaped element, and said tube shaped element with the knobs therein is the then mounted in said part of said mold by attaching the knobs to the said part of said mold.

4. A method of making a buoyant body of plastic and having a passage therethrough for a rope or the like, which comprises making in a first operation a tube-shaped plastic element, attaching two knobs to the inside surface of one part of the shell-shaped two-part mold at points spaced from each other and force fitting the ends of said tube-shaped element on the knobs, the openings of said tube-shaped element when positioned in the mold being in close proximity to the inside surface of the mold, placing thermoplastic material in one of said mold parts and removably attaching the mold parts together, heating and rotating said closed mold causing said thermoplastic material to cling to the interior surface of the mold and to the external surfaces of the ends of the tube-shaped element, thereby causing said ends of the element to be embedded in said thermoplastic material but leaving the openings free, and thereafter separating the mold parts and removing the buoyant body from the mold and from said knobs.

5. A method of making a buoyant body of plastic and having a passage therethrough for a rope or the like, which comprises making a first operation a tube-shaped plastic element, attaching two knobs to the inside surface of one part of the shell-shaped two-part mold at points spaced from each other and threading the ends of said tube-shaped element on the knobs, the openings of said tube-shaped element when positioned in the mold being in close proximity to the inside surface of the mold, placing thermoplastic material in one of said mold parts and removably attaching the mold parts together, heating and rotating said closed mold causing said thermoplastic material to cling to the interior surface of the mold and to the external surfaces of the ends of the tube-shaped element, thereby causing said ends of the element to be embedded in said thermoplastic material but leaving the openings free, and thereafter separating the mold parts and removing the buoyant body from the mold and from said knobs.

6. A method of making a buoyant body of plastic and having a passage therethrough for a rope or the like, which comprises making in a first operation a tube-shaped plastic element having flanges on the open ends thereof, attaching two knobs to the inside surface of one part of a shell-shaped two-part mold at points spaced from each other and mounting said tube-shaped element on the knobs with said flanges on said tube-shaped element positioned in the mold in intimate contact with the inside surface of the mold, placing thermoplastic material in said mold part and removably attaching the mold parts together, heating and rotating said closed mold causing said thermoplastic material to cling to the interior surface of the mold and to the external surface of the ends of the tube-shaped element and on the surface of the flanges, thereby causing said ends of the element and said flanges to be embedded in said thermoplastic material, but leaving the openings of the tube element free, and thereafter separating the mold parts and removing the buoyant body from the mold and from said knobs.

7. A method of making a buoyant body of plastic and having a passage therethrough for a rope or the like, which comprises making in a first operation a tube-shaped plastic element having flanges on the open ends thereof, attaching two knobs to the inside surface of one part of a shell-shaped two-part mold at points spaced from each other and mounting said tube-shaped element on the knobs, said flanges on said tube-shaped element being in a spaced relationship to the inside surface of the mold, placing thermoplastic material in one of said mold parts and removably attaching the mold parts together, heating and rotating said closed mold causing said thermoplastic material to cling to the interior surface of the mold and to the external surface of the ends of the tube-shaped element and on the inwardly as well as on the outwardly facing surfaces of said flanges thereby causing said flanges to be embedded in said thermoplastic material, but leaving the tube element openings free, and thereafter separating the mold parts and removing the buoyant body from the mold and from said knobs.

8. A mold structure for making a buoyant body of plastic having a passage therethrough for a rope or the like, comprising a two-part shell-shaped mold, two knobs, and means for attaching said knobs to the inside surface of one part of said two-part mold, whereby a tube-shaped plastic element can be mounted on said knobs and said knobs attached to the inside surface of said one mold part, or said knobs can be attached to the inside surface of said one mold part and a tube-shaped plastic element mounted between the knobs, and thereafter the mold can be assembled with a thermoplastic material therein and heated and rotated to cause the thermoplastic material to cling to the interior surface of the mold and the internal surfaces of the ends of the tube-shaped element so that the ends of the tube-shaped element are embedded in the thermoplastic material while the openings in the ends of the tubes are left free, after which the mold parts can be separated and the buoyant body removed from the mold and the knobs.

9. A method of making a buoyant body of plastic and having a passage therethrough for a rope or the like, which comprises making in a first operation a tube-shaped plastic element, providing a shell-shaped two part mold having means for attaching to the inside surface thereof two knobs at points spaced from each other, the step of attaching two knobs and the tube-shaped plastic element extending between them to said shell-shaped mold with the openings in the ends of said tube-shaped element in close proximity to the inside surface of the mold and placing thermoplastic material in one of said mold parts and removably attaching the mold parts, and then heating and rotating the closed mold causing the thermoplastic material to cling to the interior surface of the mold and to the external surfaces of the ends of the tube-shaped element, thereby causing the ends of the element to be embedded in said thermoplastic material but leaving the openings free, and thereafter separating the mold parts and removing the buoyant body from the mold and from said knobs.

References Cited in the file of this patent
UNITED STATES PATENTS

| | | |
|---|---|---|
| 2,730,765 | Crafton et al. | Jan. 17, 1956 |
| 2,944,814 | Thoeming | July 12, 1960 |
| 2,959,820 | Miller et al. | Nov. 15, 1960 |